Feb. 4, 1958 J. R. FITZGERALD 2,821,957
WAX APPLICATOR FOR FRUITS, VEGETABLES AND THE LIKE
Filed Oct. 27, 1953 3 Sheets-Sheet 1
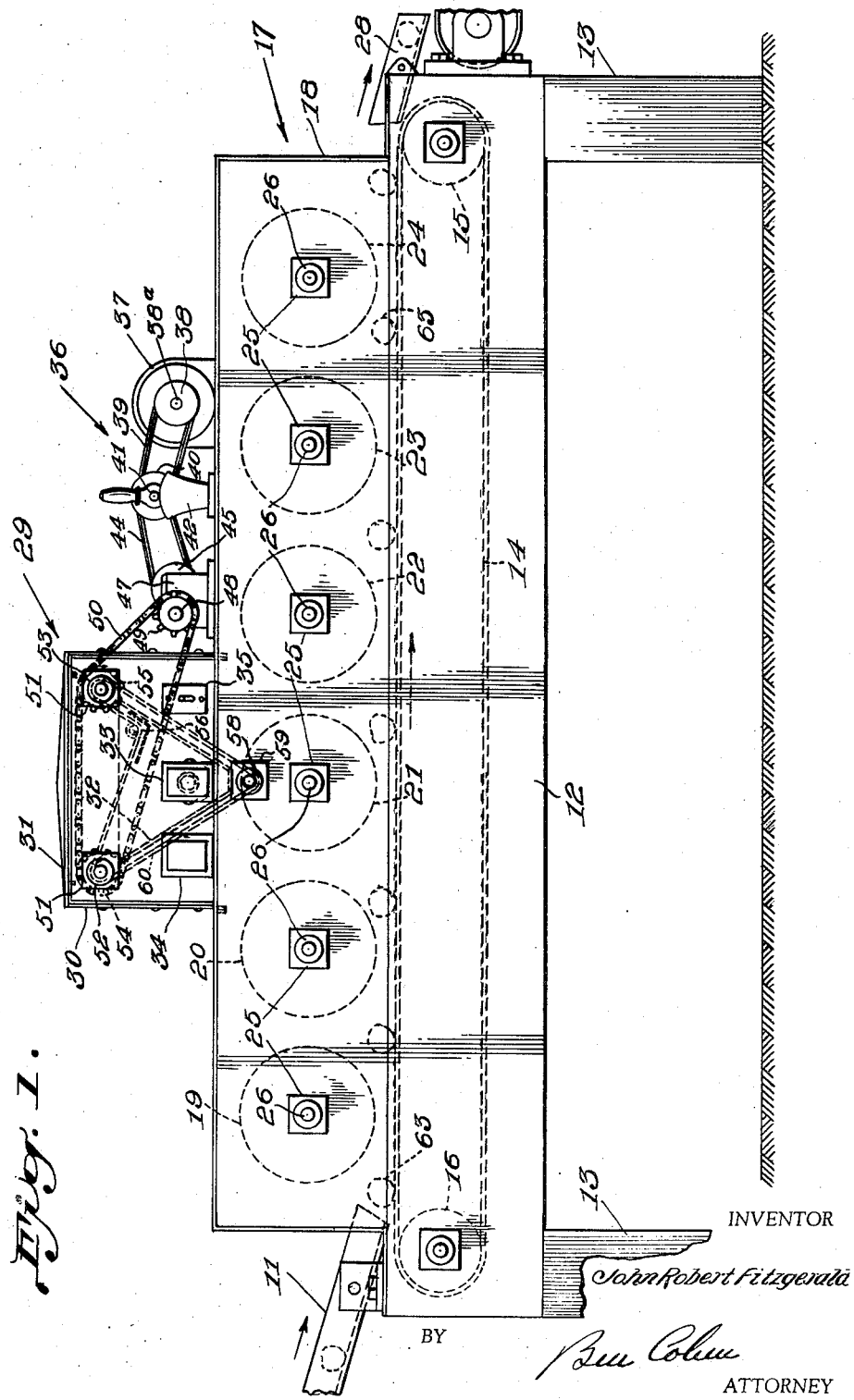
INVENTOR
John Robert Fitzgerald
BY
Bill Cohen
ATTORNEY

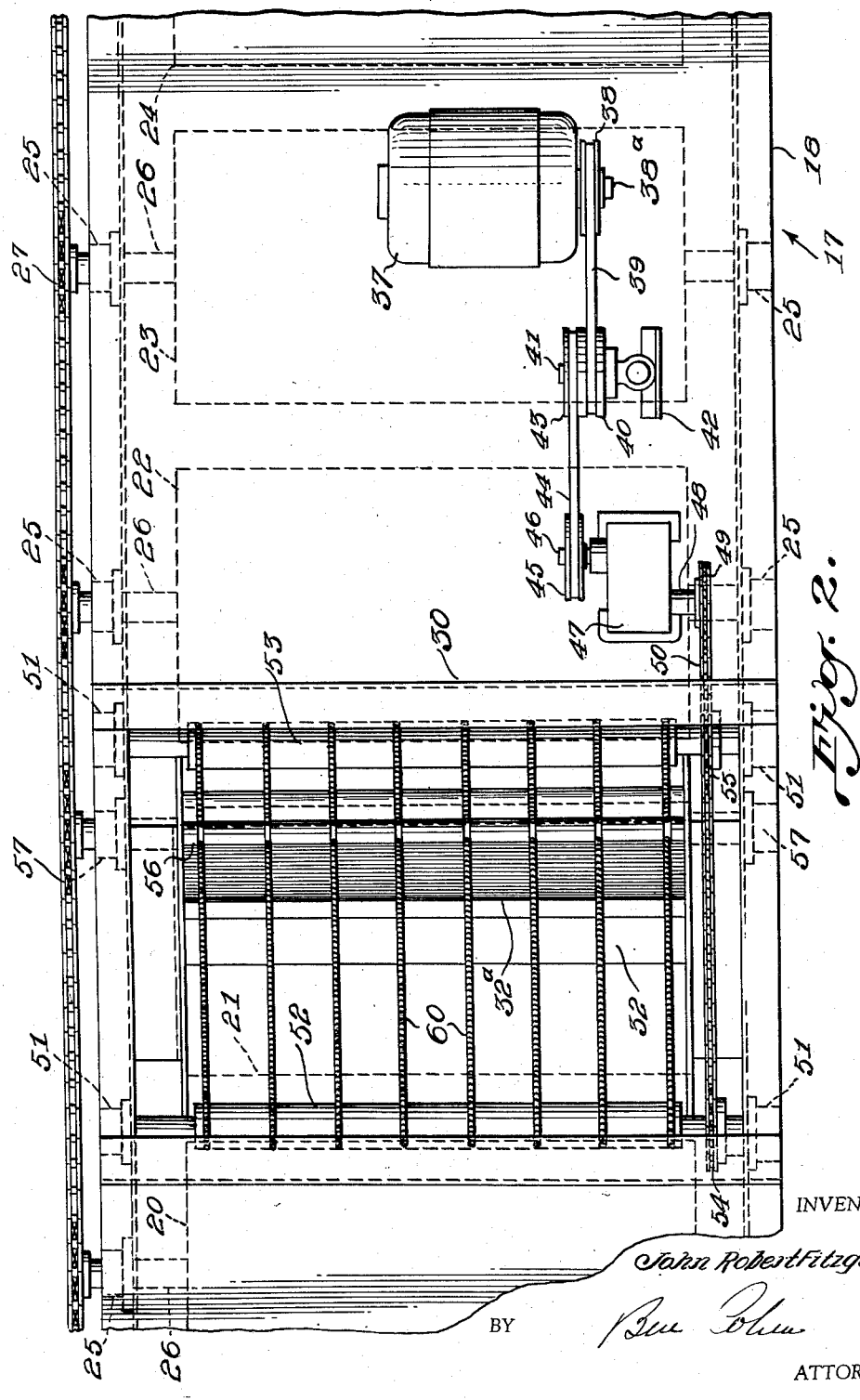

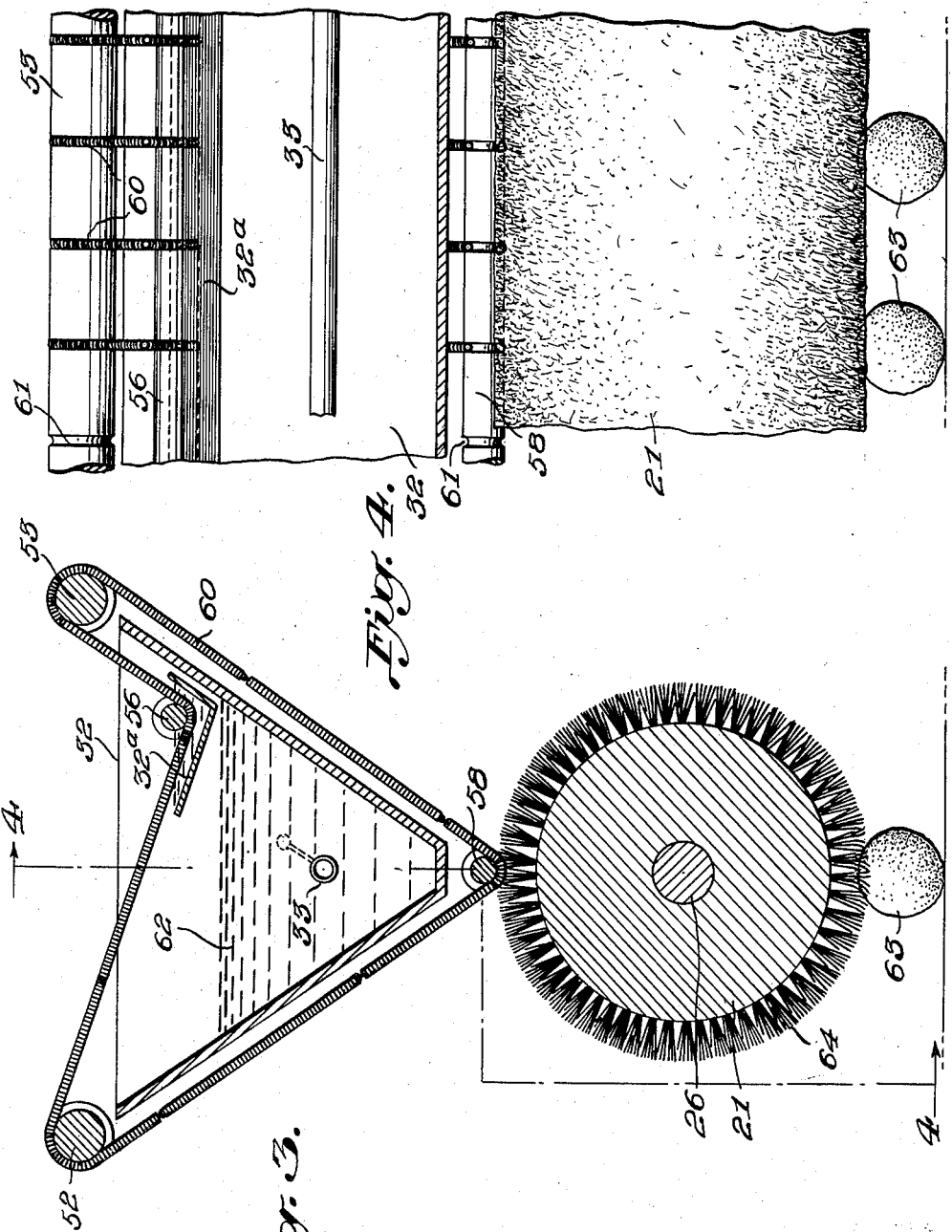

United States Patent Office 2,821,957
Patented Feb. 4, 1958

2,821,957

WAX APPLICATOR FOR FRUITS, VEGETABLES AND THE LIKE

John R. Fitzgerald, Harlingen, Tex.

Application October 27, 1953, Serial No. 388,510

1 Claim. (Cl. 118—13)

This invention relates to an apparatus and method for applying a preservative coating to fruits, vegetables and the like.

The use of preservatives such as wax, paraffin, or other similar substances for the preservation and protection of fresh fruits and vegetables has been known for some time. Such an application will help prevent such edibles as oranges, apples, lemons, grapefruit, peaches, pears, avocados, potatoes from withering, losing flavor, rotting or molding; and at the same time will give a lustrous appearance to the food that will greatly enhance its appearance. Thus, the marketability and saleability of these fruits and vegetables are improved through the dual channels of preserving their food value and their eye appeal.

The older methods used in the industry for applying these coatings have not, however, been entirely successful. For example, rubbing solid wax against a brush and bringing the object to be coated in contact with the brush results in uneven coating and marked difficulty in causing adherence of the wax. Another process used has been the one involving placing wax in a volatile solvent, spraying the solution on the fruit or vegetable, and allowing the solvent to evaporate and leave a wax deposit. This has caused a great deal of trouble with clogging spray nozzles, complex mechanism, inflammability of the solvent, undesirable reaction of the solvents with the food, and a dull coating.

A third method has been the application of an aqueous solution of wax by spraying, which again leads to nozzle and mechanism problems, and further necessitates added mechanism for drying water from the coating. Still another old method involves application of molten wax by dipping, which also gives an uneven coating of wax, and subjects the food to an undesirably high temperature.

My novel method and apparatus improve on the existing ones by dipping up melted wax and depositing it on an applicator brush or buffer in such a way that the amount of wax can be carefully controlled. This careful control is especially important in order to give an even coating of the correct thickness over the entire surface of the fruit or vegetable. A coating that is too heavy not only is wasteful of wax, but gives an unattractive dull finish instead of a glowing one; a coating that is too light will fail to give the proper protection. My method avoids complex mechanism and eliminates the need to raise the temperature of the food.

A principal object of my invention is to provide a simple method and apparatus for applying an even, consistent coating of wax on fruits and vegetables without injuring them.

It is a further object of my invention to provide an effective method of controlling the amount of wax being applied in accordance with the type or size of the objects being coated.

It is an additional object of my invention to provide an apparatus which is easily adaptable to existing grading, conveying, or treating apparatus.

It is a still further object of my invention to provide an apparatus that applies the coating in an efficient and waste-free manner.

Certain typical embodiments of the invention are hereinafter described and illustrated in the accompanying drawings in which:

Figure 1 is a side elevational view of a form of my novel apparatus mounted on a conveyor.

Figure 2 is a plan view of a portion of the apparatus of Figure 1.

Figure 3 is a side elevational view, partly in section, of a portion of the apparatus, and Figure 4 is a section taken along line 4—4 of Figure 3.

Referring now to the drawings, and particularly Figures 1 and 2, a grading or conveyor 11 is shown leading to a conveyor table 12 consisting of supports 13 resting on or bolted to the floor, and a conveyor belt 14 carried on and actuated by drums 15 and 16 which are driven by a conventional drive mechanism (not shown). A buffer unit 17 is mounted on the conveyor table 12 by bolting or other suitable means, and consists of the housing 18 in which are carried cleaning buffers 19 and 20, applicator buffer or brush 21, and spreader buffers 22, 23 and 24. These buffers include indentical shafts 26 on each end which are mounted in identical bearings 25 carried on the housing 18. The shafts 26 are driven by drive chain 27 by means of a conventional driving mechanism (not shown). The conveyor belt 14 leads to another conveyor 28 which forms a part of the packaging system.

The portion of the apparatus heretofore described is of conventional design and forms no part of my present invention.

Mounted on the buffer unit 17, preferably by bolts or other rigid means, is the waxer unit 29, which is located directly over the axis of the applicator buffer 21. The unit consists of the supporting frame 30, cover 31 mounted thereon, and a tank 32 which is carried by frame 30 by welding, bolting, or other conventional rigid means. Also mounted on the frame 30 is a thermostatically controlled heater 33 of the conventional electric type; a knife switch and fuse box 34 for controlling the heater; and a motor control 35 for controlling the waxer driving mechanism 36 (hereinafter described).

Also carried on frame 30 are identical bearings 51 on which are rotatably mounted driving rollers 52 and 53, each of which terminates in sprockets 54 and 55 at one end. These rollers are mounted just above tank 32 and are radially grooved at intervals along their length for purposes about to be described. Another roller 56 is carried within the tank 32, and is rotatably carried by a bearing 57 at each end, and still another roller 58 is rotatably carried just below the tank 32 by a bearing 59 at each end. These bearings 57 and 59 are mounted on the frame 30. A plurality of coil springs 60, of conventional tension type, are passed around the rollers 52, 53, 56 and 58, carried within the grooves 61.

As shown in Figure 3, the roller 56 is mounted adjacent the upper portion of the tank 32 and is received within a tray 32a. The wax in 32 is indicated by numeral 62 and the upper level of the wax is normally below the tray 32a. Suitable pumping means (not shown) is provided for continuously pumping the fluid wax from the tank 32 to the tray 32a in such manner that the tray is always full of wax with the excess wax overflowing the sides of the tray into the tank 32. Since the depth of the wax in the tray is substantially constant, the springs 60 will pick up the proper amount of wax thus assuring precision in the application of the wax to the transfer brush.

Also mounted on the buffer unit 17, adjacent the waxer unit 29, is the waxer driving mechanism 36 which consists of a conventional electric motor 37, carrying pulley 38 fixably mounted on its shaft 38a. A belt 39 runs from pulley 38 to pulley 40 which is fixed on the shaft 41 of a transmission mechanism 42 such as a Toledo transmission, thus transmitting the power of the motor to the transmission. Also fixed to shaft 41 is another pulley 43 which transmits the power from transmission mechanism 42 by means of belt 44 to pulley 45 fixed on shaft 46 of a reducing mechanism 47. The reducing mechanism also includes another shaft 48, on which is carried fixed sprocket 49 which drives a chain 50 connected with sprockets 54 and 55 which were previously described. The motor 37 and transmission and reducer mechanisms 42 and 47 are bolted or otherwise rigidly mounted on the buffer unit 17.

The operation of the mechanism is as follows. Wax 62 is placed in the tank 32 in a solid, powdered, or liquid form at the start of the operation. This wax is substantially odorless and tasteless so that it will not be objectionable to human consumption in the event that it is not removed prior to final use. It is also chemically resistant to formation of fungus or bacteria, and impervious to water or other liquids so that a high degree of protection will be afforded to the fruit or vegetable. The heater 33 is turned on and maintained by its thermostatic setting to the temperature which provides the proper viscosity of wax for the particular application. The vegetables or fruits 63 pass from the grading conveyor 11, pass on to the belt 14, and are carried first under the cleaning buffers 19 and 20 which prepare the surface of the food for coating. They then pass under the buffer 21 for the actual coating process.

The rollers 52 and 53 are caused to rotate by means of the transmission system previously described, when the driving motor 37 is started. The transmission mechanism 42 enables the operator of the apparatus to vary the speed of the rollers almost infinitely, in order to closely control the coating applied to the edibles. As these rollers 52 and 53 rotate, they cause the springs 60 to travel along their length due to their tension around the rollers 52, 53, 56 and 58. As these springs pass into the liquid wax in tray 32a, they dip some of the wax up, carry them along their length, and drip them onto the bristled exterior 64 of the applicator buffer 21. The buffer is caused to rotate along with the other buffers through chain 27, and during this rotation, the fruit or vegetable passing under it is thoroughly coated, then passes on the belt 14 under spreader buffers 22, 23 and 24 where the wax is spread more evenly. The coated products are then passed on to the conveyor 28 for transmission to the packaging steps.

Other modifications of this apparatus may be used without significant change, for example, belts or chains may be used in place of the springs 60. Or the spreader buffers may be eliminated and a bed of brushes may be located under the fruit or vegetables.

It can readily be seen that this apparatus is capable of a high degree of flexibility and versatility. The waxer unit may be installed on any existing conveyor or other system, the effective wax distribution onto the buffer may be varied by simply changing the number of springs 60, and the type of coating may easily be varied by merely changing the speed of the roller rotation. The result is a device that affords consistent, economical coating to fruits and vegetables with no danger of injuring them in any way.

The specific apparatus above described is merely illustrative, but I do not intend to be limited by the details therein. Changes within the scope of the man skilled in the art are considered to be within the spirit of the invention.

In the following claim, the term "fruits" is understood to include vegetables as well, as previously described.

Having thus described the invention, what is claimed is:

In an apparatus for coating fruit including mechanism for conveying said fruit and a buffer for applying the coating to the fruit, a tank containing coating material, a pair of rollers mounted adjacent the upper edge of the tank, a roller positioned within the tank, a roller positioned closely above the buffer and an endless coating depositing means passing over said rollers for depositing coating material from said tank directly onto the buffer, said endless coating depositing means comprising a coiled spring member.

References Cited in the file of this patent
UNITED STATES PATENTS

| | | |
|---|---|---|
| 1,153,585 | Vicars | Sept. 14, 1915 |
| 1,528,935 | MacDonald | Mar. 10, 1925 |
| 1,540,791 | McDill | June 9, 1925 |
| 1,618,159 | Ahlburg | Feb. 22, 1927 |
| 1,985,293 | Kimball | Dec. 25, 1934 |
| 2,136,118 | Palmer | Nov. 8, 1938 |
| 2,469,030 | Brown | May 3, 1949 |
| 2,535,573 | Hettinger | Dec. 26, 1950 |
| 2,578,427 | Hussey et al. | Dec. 11, 1951 |